United States Patent [19]
Katayama et al.

[11] Patent Number: 5,735,583
[45] Date of Patent: Apr. 7, 1998

[54] DEVICE FOR DETECTING FAILURE OF MICROCOMPUTER IN ANTILOCK CONTROLLER

[75] Inventors: Yoshio Katayama; Kazumi Yasuzumi; Masahiro Sakaguchi, all of Itami, Japan

[73] Assignee: Sumitomo Electric Industries, Ltd., Osaka, Japan

[21] Appl. No.: 436,235

[22] PCT Filed: Sep. 21, 1994

[86] PCT No.: PCT/JP94/01553

§ 371 Date: May 17, 1995

§ 102(e) Date: May 17, 1995

[87] PCT Pub. No.: WO95/08464

PCT Pub. Date: Mar. 30, 1995

[30] Foreign Application Priority Data

Sep. 21, 1993 [JP] Japan ................... 5-234922

[51] Int. Cl.⁶ ................................................. B60T 8/96
[52] U.S. Cl. ................... 303/122.05; 303/122.04; 303/122.07
[58] Field of Search ........... 303/122.04, 122.05, 303/122.06, 122.07

[56] References Cited

U.S. PATENT DOCUMENTS

| | | | |
|---|---|---|---|
| 4,745,542 | 5/1988 | Baba et al. | 303/122.04 |
| 4,773,072 | 9/1988 | Fennel | 303/122.05 |
| 5,001,641 | 3/1991 | Makino | 303/122.05 |
| 5,176,429 | 1/1993 | Junichi et al. | 303/122.05 |
| 5,265,944 | 11/1993 | Gloceri | 303/122.07 |

FOREIGN PATENT DOCUMENTS

| | | | |
|---|---|---|---|
| 2604148 | 8/1977 | Germany | 303/122.04 |
| 4122016 | 1/1993 | Germany | 303/122.06 |

*Primary Examiner*—Matthew C. Graham
*Attorney, Agent, or Firm*—Wenderoth, Lind & Ponack

[57] ABSTRACT

An anti-lock controller apparatus is constituted of a single microcomputer to reduce production costs and improve safety and reliability. Signals of wheel speed sensors $S_1$ to $S_4$ divided into two groups by an input processing circuit and are inputted to the single microcomputer. The single microcomputer executes two-system input/output processing and checks for abnormalities of the input/output signals.

16 Claims, 9 Drawing Sheets

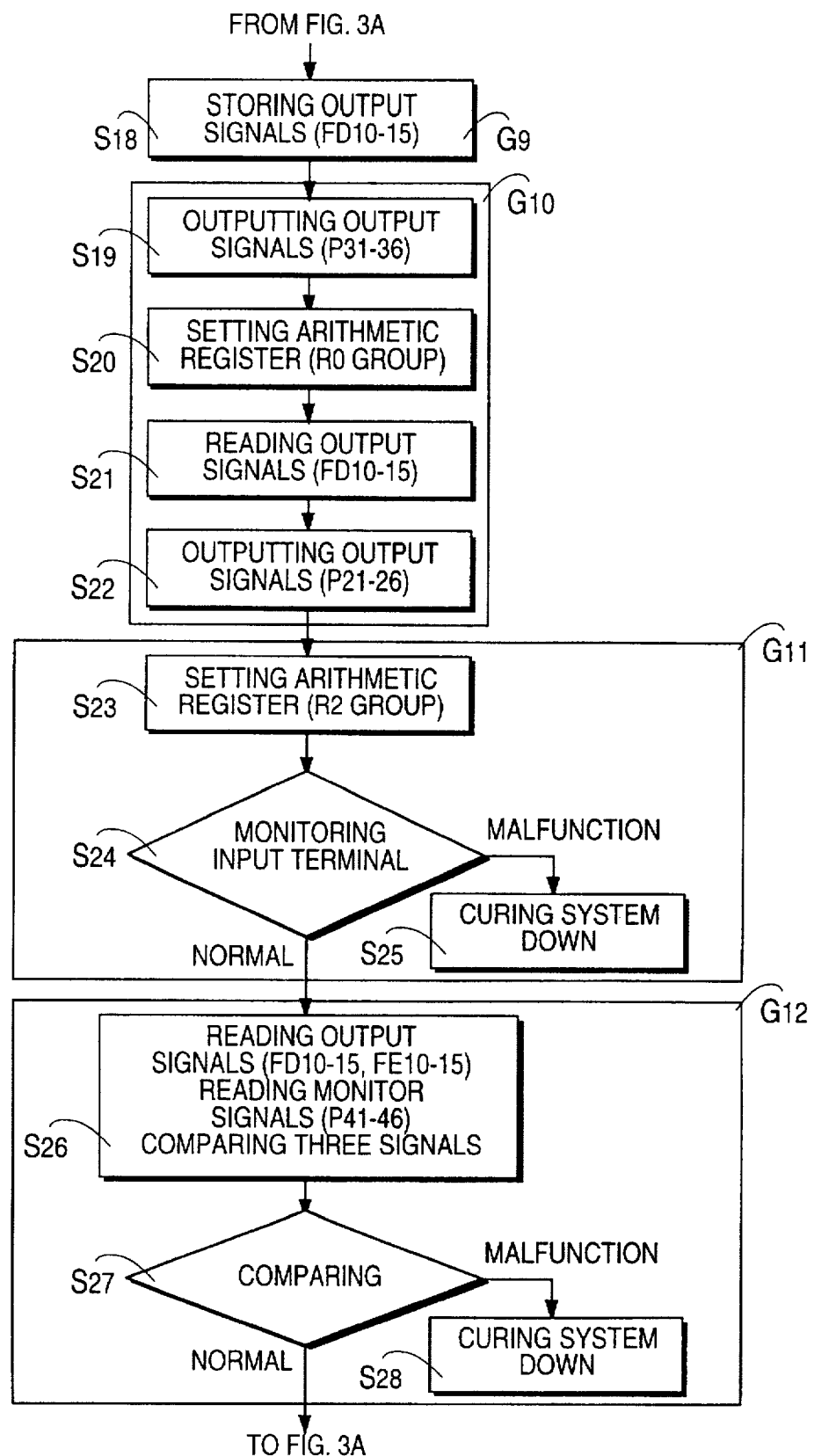

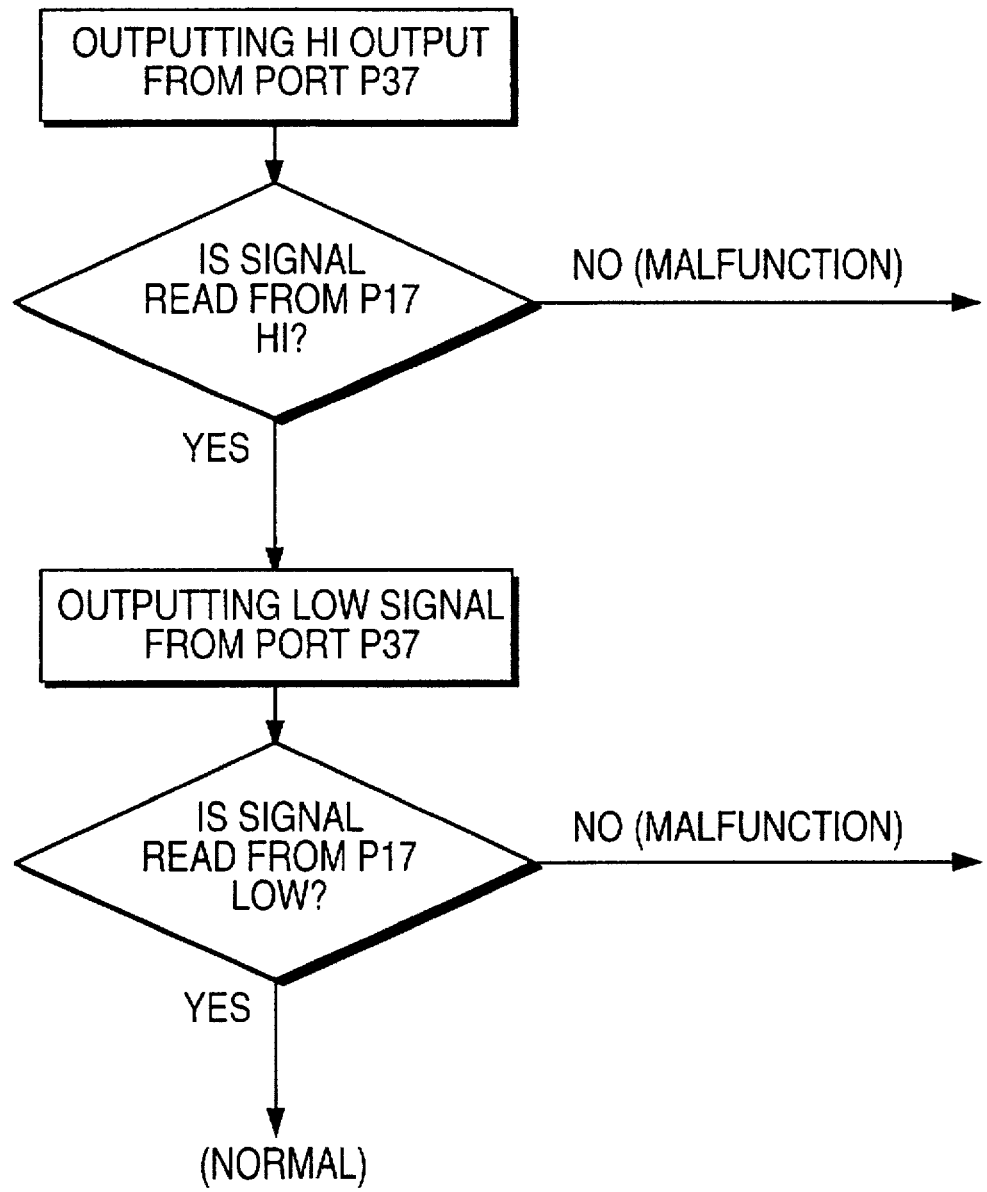

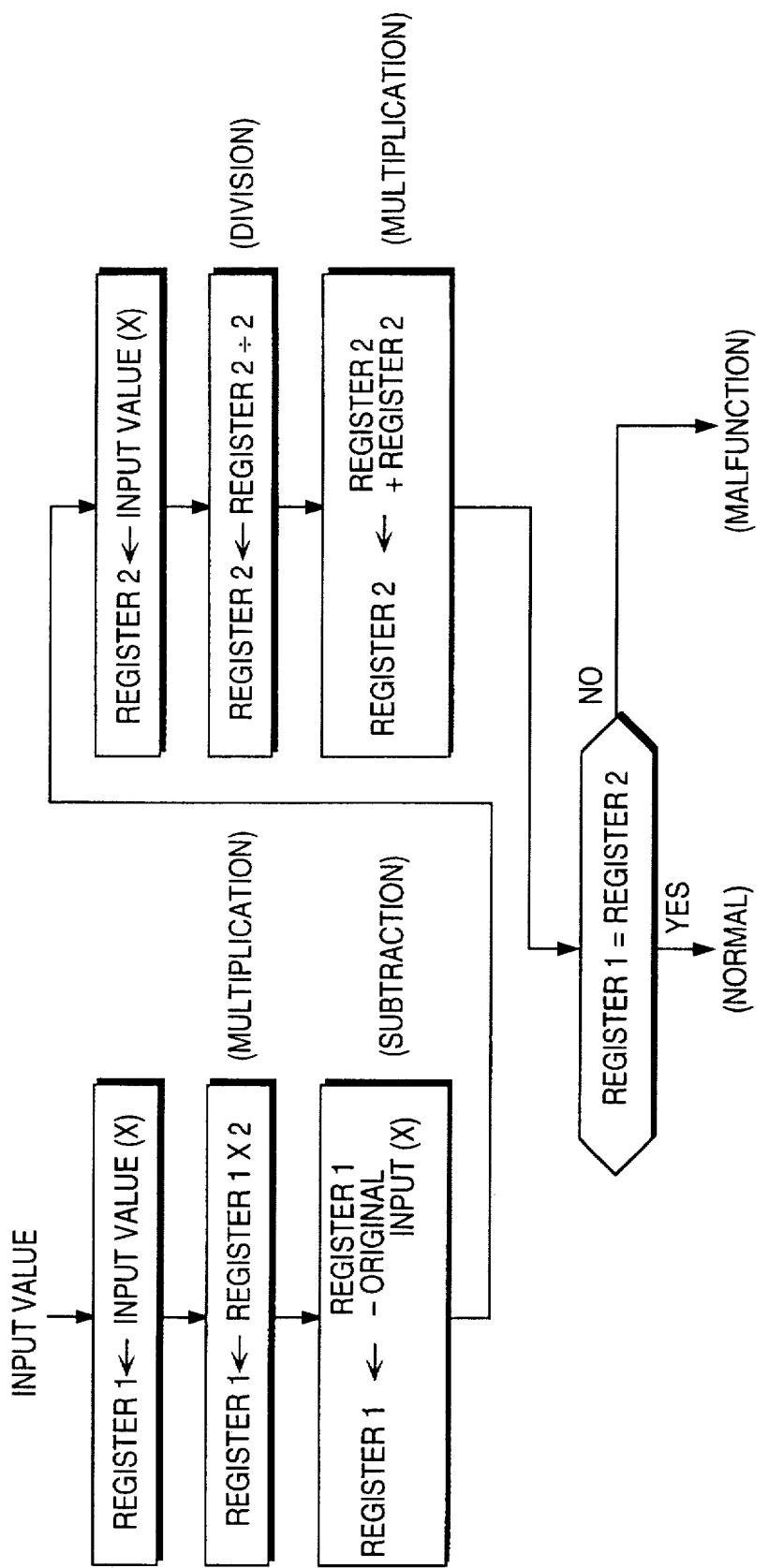

DEVICE FOR DETECTING FAILURE OF MICROCOMPUTER IN ANTILOCK CONTROLLER

FIELD OF THE INVENTION

This invention relates to an antilock controller for controlling automotive brakes.

DESCRIPTION OF THE RELATED ART

An increasing number of modern cars are equipped with antilock controllers for controlling their brakes most efficiently according to the road conditions.

An antilock controller acts to reduce the brake fluid pressure on the wheel cylinder upon detecting any lockup tendency of the corresponding wheel, and re-increase the brake fluid pressure when the lockup tendency disappears. By repeating such pressure reductions and re-increases in a very short time, the car can be decelerated quickly while keeping its stability.

Since an antilock controller is a device which reduces the brake fluid pressure while brakes are being applied, it is required to operate with high reliability not only while the entire brake system is functioning normally, but even if the system has failed. Namely, absolute reliability is required for each of its various functions, including the function of calculating the wheel speeds, acceleration, estimated vehicle speed, slip rates, etc., and the function of producing a pressure reduction signal to reduce the fluid pressure on a wheel cylinder according to the results of calculation. Furthermore, it has to have a function of prohibiting pressure reduction if the brake system has failed.

U.S. Pat. No. 4,546,437 and Unexamined Japanese Patent Publication 63-233401 disclose antilock control circuits that satisfy all of the abovementioned requirements.

The control circuit disclosed in the former has two mutually independent microcomputers. Each computer receives the data from the other computer and monitors it. One of the computers is a main computer which controls control valves and other brake parts.

The control circuit disclosed in the latter also comprises two mutually independent microcomputers. Each input signal is split into two identical signals, which are inputted in the respective microcomputers. Based on the signals received, the two computers perform identical calculations and output signals independently of each other. If the output signals of the two computers are identical, antilock control is carried out based on the output signals. If these two signals are different and the difference is within a permissible range, antilock control is carried out based on signals determined by such difference. If the difference is too large, antilock control function is deactivated.

Both of these conventional antilock control circuits require more than one microcomputer and thus tend to be costly, though their reliability is fairly high.

One possible solution to this problem is to use a single microcomputer having the same function as is processed in a conventional one-assembly microcomputer.

It is possible to provide two programs in such a microcomputer to process signals split in two lines. But logic operations according to both programs are carried out in a single unit. Thus, it is impossible to detect a failure of the single unit.

An object of this invention is to provide an antilock controller in which signals split in two lines are processed in the logic operation circuit of a single microcomputer and which is less expensive and operates as safely, stably and reliably as a conventional controller using two independent microcomputers.

Another object of the invention is to provide a control logic operation circuit for use in an antilock controller which has a single microcomputer including a checking circuit for checking the commands produced by its central processing logic circuit according to a simple check program, and which operates as safely, stably and reliably as a conventional control circuit.

SUMMARY OF THE INVENTION

According to this invention, there is provided an antilock controller comprising wheel speed detecting means for producing wheel speed signals, means for splitting the wheel speed signal into two identical signals, and a single control logic operation circuit including at least two input terminals through which the split signals are separately inputted in the logic circuit, a first processing circuit and a first variable storage circuit for determining a first output by receiving and processing one of the two split signals, a second processing circuit and a second variable storage circuit that are identical to the first processing circuit and first variable storage circuit for determining a second output by receiving and processing the other split signal, at least two output terminals through which the first and second outputs are separately outputted, an output determining logic circuit for processing the first and second outputs and determining an output signal for driving solenoid valves, relays and other driven elements, and an output abnormality detection circuit for determing whether the output signal is normal by comparing and calculating signals processed by the output determining logic circuit.

In this arrangement, the wheel speed signals from the wheel speed detecting means are processed in the input processing circuit, split in two lines, and inputted into the single control logic operation circuit through different input terminals. The control logic operation circuit processes the signals and produces output signals through different output terminals. The output signals are processed in the output determining logic circuit and used to control the brake fluid pressure by controlling at least solenoid valves, thereby preventing wheel lockups.

In the logic operation circuit, two input signals are compared. If the difference between them is within a predetermined range, they are judged normal and antilock control is started. If not, they are judged not normal and antilock control is stopped. Unlike conventional arrangements, these control and monitoring functions are carried out in the single control logic operation circuit.

During such antilock control, various operations are carried out based mainly on wheel speed signals to determine whether to increase or reduce the brake pressure. But if the vehicle is decelerated rapidly due to sharp braking, the differentiated value of the wheel speed signals may not necessarily represent the acceleration accurately. Thus, it is an ordinary practice to provide an acceleration detector besides the wheel speed sensors.

It is preferable that the vehicle acceleration signal be also inputted into the logic circuit after splitting them in two lines The acceleration signal is inputted as a reference acceleration signal to the processing circuits. If the difference between the vehicle acceleration signal obtained by differentiating the wheel speed signals and the reference acceleration signal is greater than a predetermined value, the latter signal is used as a correct reference signal.

The switch signal from the switch input detecting means is used to improve the accuracy of antilock control. Namely, this signal is also used as a reference when determining whether to increase or reduce brake pressures.

In this arrangement, the two split signals may be processed in the following order: storing one of the split signals in the first variable storage circuit; storing the other split signal in the second variable storage circuit; processing the signal stored in the first variable storage circuit; and processing the signal stored in the second variable storage circuit.

In another embodiment, the antilock controller comprises an input comparison/processing unit for detecting any abnormality of signals by comparing the signals, a pressure increase/reduction judging unit for calculating wheel speeds, a reference wheel speed, slip rates, etc. according to a predetermined operation program and producing control signals for increasing, reducing or hold brake pressures, and an output signal distributing unit for distributing the output signals to predetermined terminals. The output signals are processed in an output processing circuit and used to control solenoid valves, relays and other elements.

Preferably, the acceleration signal from the vehicle acceleration detector is split into two identical signals and inputted into the single control logic operation circuit through different input terminals. The two split signals are compared in a second input comparison/processing unit to judge whether or not they are normal. The signals are then sent to the pressure increase/reduction judging unit as a reference acceleration signal used to judge whether to increase or reduce brake pressures.

Such a controller may further comprises a means for producing a brake switch signal. It is processed in the logic circuit in the same way as the wheel speed signal.

Also, it may further comprise an input terminal monitoring circuit comprising an additional input terminal connected only to one of the output terminals, and an input circuit for monitoring a signal inputted into the additional input terminal from the one of the output terminals.

Further, the output abnormality detection circuit may judge that the two outputs are normal if the interval between the times when the two outputs are produced is smaller than a predetermined value, and judge that the two outputs are not normal if this time interval is greater than the predetermined value.

From another aspect of the invention, there is provided a control logic operation circuit for use in an antilock controller comprising a single control logic operation circuit including at least one input terminal, at least one output terminal, a processing circuit for processing an input signal inputted through the input terminal, a variable storage circuit for storing the input signal and variable produced by the processing circuit, and a central processing logic circuit for determining an output by processing signals from the processing circuit and the variable storage circuit, the processing circuit including a first and a second checking circuit for checking if the central processing logic circuit is functioning normally, the checking circuits being adapted to perform logic operations separately from each other, compare the results of the logic operations, and producing an abnormality signal if the results are not coincident with each other.

In this arrangement, a single control logic operation circuit (microcomputer) having a single processing circuit and a single variable storage circuit is used. Namely, antilock control is carried out using a single microcomputer unlike conventional arrangements in which two microcomputers are used in parallel or used to monitor each other. Such a system is, however, unsafe and unreliable if it has no checking means.

Thus, in this arrangement, there are provided a first and a second check circuit to check if the microcomputer is functioning normally and thus to improve safety, stability and reliability of the entire device.

Ordinarily, the checking operation by the first and second checking circuits is carried out before the normal control program (antilock control program in this invention) is started. But it may be carried out during the control program or after the control program.

In one arrangement, the input terminal comprises at least two input terminals through which two identical signals obtained by splitting a single input signal are separately inputted; the processing circuit and the variable storage circuit comprise a first processing circuit and a first variable storage circuit for receiving and processing one of the two split signals, and a second processing circuit and a second variable storage circuit for receiving and processing the other split signal; the central processing logic circuit processes the signals produced by the first and second groups of circuits to produce a first and a second output; the output terminal comprises at least two output terminals through which the first and second outputs are outputted, respectively; and the logic operations in the first and second checking circuits are performed before carrying out the logic operations in the first and second processing circuits.

The control logic operation circuit of this invention is the same single control logic operation circuit as in the first invention except that it further includes the first and second checking circuits. The checking circuits check whether or not the central logic operation circuit is functioning normally by judging whether the results of logic operations by the two checking circuits are coincident with each other before starting the logic operations according to the main programs.

In carrying out the checking operations by the two checking circuits, commands from the central logic operation circuit are given to the first processing circuit and variable storage circuit and to the second processing circuit and variable storage circuit in the same order as when processing the first and second main control programs in the control logic operation circuit.

If the results of logic operations in the two checking circuits are coincident with each other, the central logic operation circuit is judged to be functioning normally. The antilock control is thus started. If not coincident, the central logic operation circuit is judged not normal and an abnormality signal is produced.

In such checking operation, it is preferable that one of the two checking circuits perform multiplications and subtractions on the data in the corresponding variable storage circuit, while the other checking circuit perform divisions and additions on the data in the other variable storage circuit.

As described, different arithmetic operations are performed in the respective checking circuits. But the results are supposed to be the same as far as the central logic operation circuit is functioning normally. Thus, it is possible to detect a failure of the single control logic operation circuit with high safety, stability and reliability.

In one arrangement, one of the checking circuits performs multiplications and subtractions on the data stored in one of the variable storage circuits, whereas the other checking circuit performs divisions and additions on the data stored in the other variable storage circuit. Namely, different arithmetic operations should be performed in the respective checking circuits.

In this case, it is preferable that the checking circuits be capable of checking all the commands of the central logic operation circuit including commands for setting and resetting flags, judgment sentence commands, and assignment/takeout commands.

With this arrangement, the first and second checking circuits check all the commands of the central logic operation circuit. Since all the commands of the central logic operation circuit are checked to see if they are normal, the safety, stability and reliability of operation improves.

BRIEF DESCRIPTION OF THE DRAWINGS

FIG. 4 is a flowchart of the input terminal monitoring process.

DETAILED DESCRIPTION OF THE PREFERRED EMBODIMENTS

Description is now made of embodiments of the invention with reference to the drawings.

Figure 1:
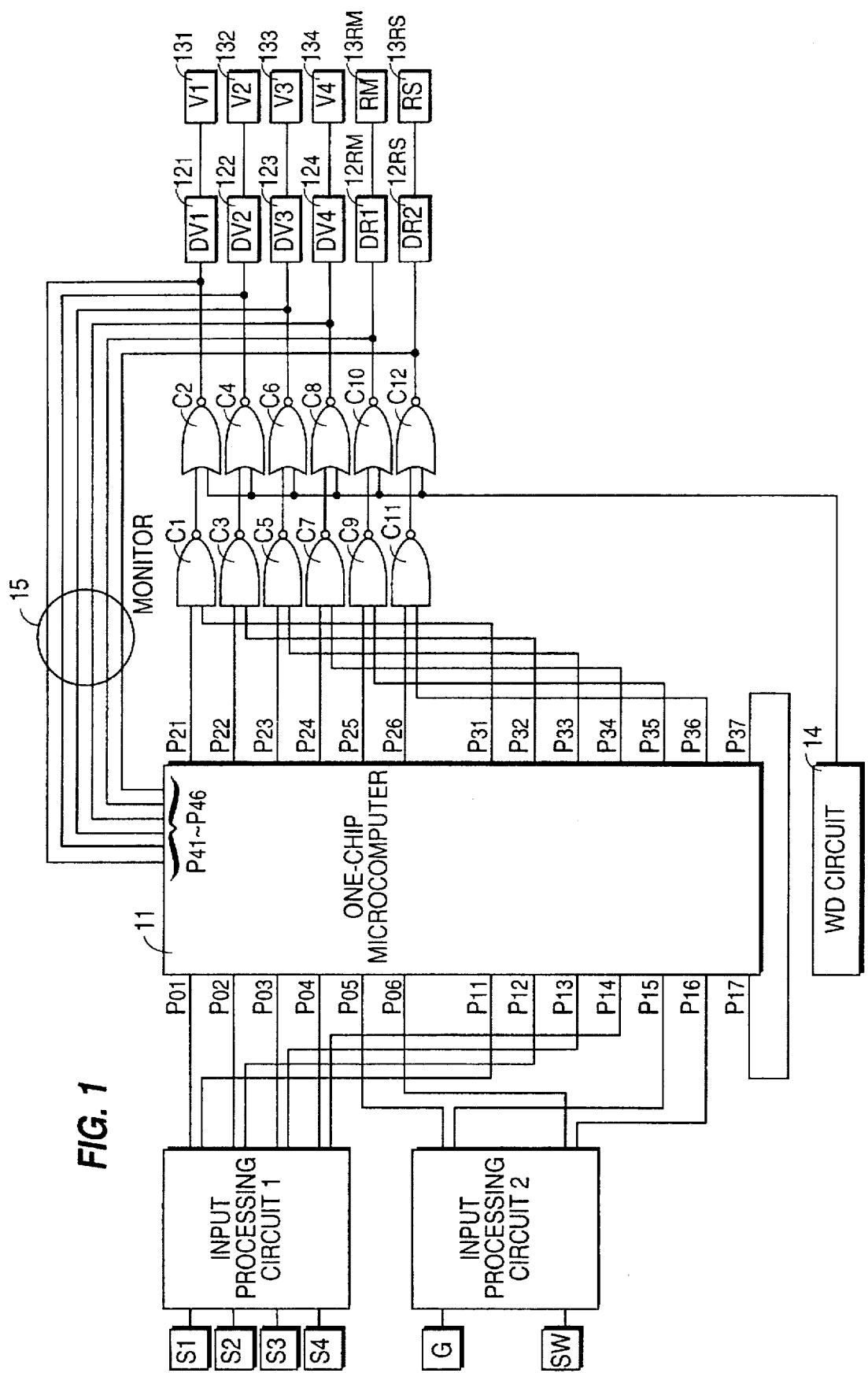
FIG. 1 is an entire schematic block diagram of an antilock controller of one embodiment.

FIG. 1 is a block diagram of an antilock control circuit of the embodiment. S1–S4 are wheel speed sensors which produce signals having frequencies proportional to the respective wheel speeds. G indicates a vehicle acceleration sensor. SW is a detector for detecting stop switch signals.

Signals from the wheel speed sensors S1–S4 are inputted in an input signal processing circuit 1, where they are waveform-shaped, binarized and split into two identical signals. The signals thus split are inputted in a one-chip microcomputer 11 through input ports at predetermined timings. More specifically, the signal from the wheel speed sensor S1 is inputted through ports P01 and P11, the signal from the wheel speed sensor S2 is inputted through ports P02 and P12. S3 signal through ports P03, P13 and S4 signal through ports P04, P14.

Signals from the acceleration sensor G and the stop switch signal detector SW are processed, waveform-shaped and split into two identical signals in an input signal processing circuit 2, and inputted in the microcomputer 11. The signal from the acceleration sensor G is inputted in ports P05, P15 whereas the switch signal is inputted in ports P06, P16.

Figure 2:
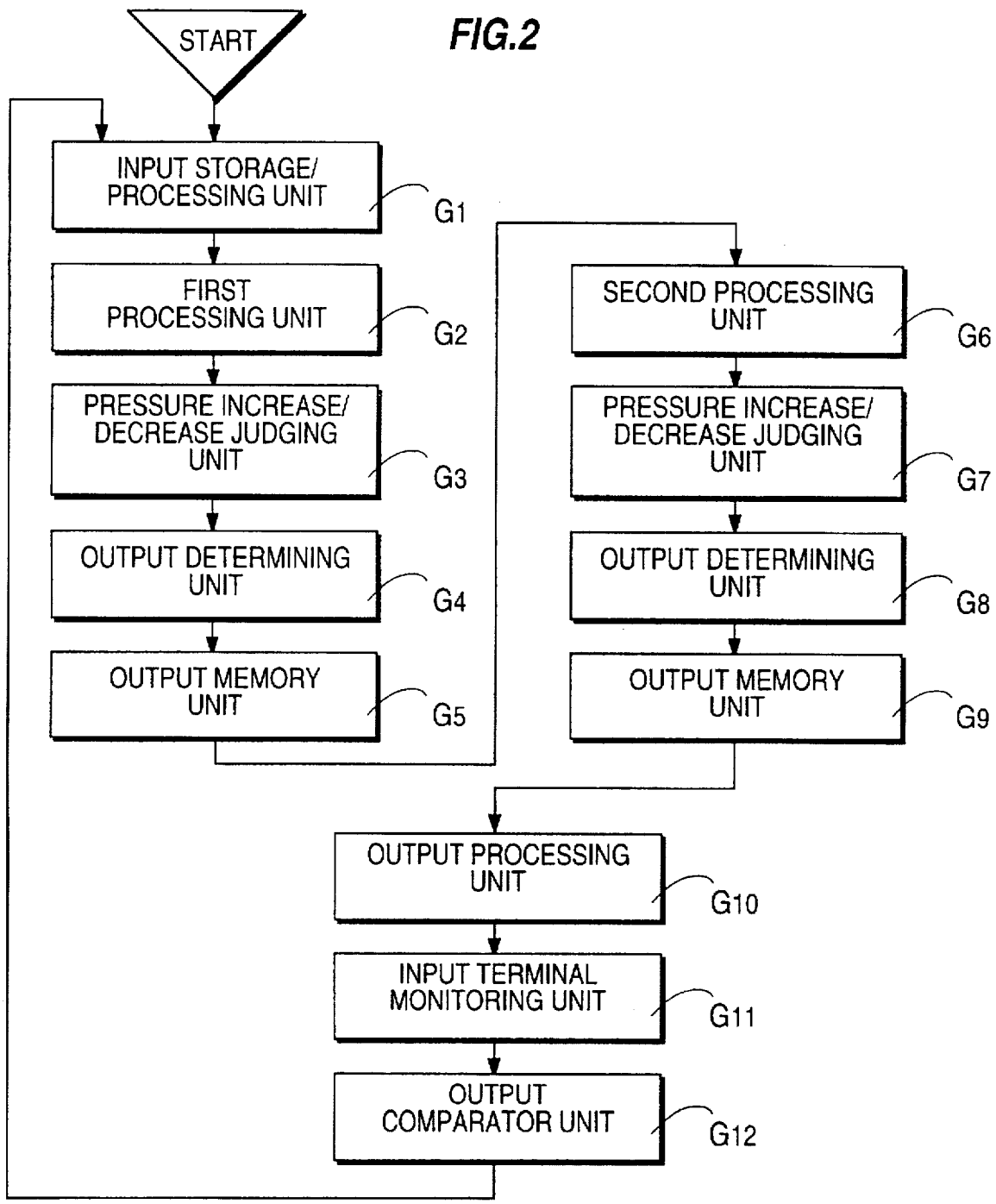
FIG. 2 is a schematic flowchart of the control logic operation circuit.

The wheel speed signals inputted in the microcomputer are processed in a control/processing circuit in the microcomputer. As shown in FIG. 2, the control/processing circuit comprises an input signal storage/processing unit, a first processing unit, a first pressure increase/decrease judging unit, a first output signal determining unit, a first output signal memory, a second series of units that are identical to the first series of units from the first processing units to the first output signal memory, an output signal processing unit, an input terminal monitoring unit and an output signal comparator. These units are all housed in the single one-chip microcomputer.

The split input signals are stored in predetermined addresses in the input signal storage/processing unit G1. The first processing unit G2 calculates wheel speeds, wheel accelerations, estimated vehicle speed, slip rates, etc. based on the input signals. The pressure increase/decrease judging unit G3 makes a judgment whether to produce a pressure increase signal or pressure reduction signal based on the results of calculation in G2. The output signal selected in G3 is outputted from the output signal determining unit G4 and stored in the output signal memory G5.

As mentioned earlier, the units G6–G9 are identical to the units G2–G5. The wheel speed signals split into two identical signals are processed in the two series of units G1–G5 and G6–G9, respectively.

The output processing unit G10 transmits output signals obtained in the above two series of units in pairs to the solenoid valves, relays and other elements to be controlled through output terminals P21 and P31, P22 and P32, P23 and P33, P24 and P34, P25 and P35, and P26 and P36.

The input terminal monitoring unit G11 monitors output signals by inputting the output from the output terminal P37 into input terminal P17. If it detects any abnormality due to e.g. failure of any input terminal, it will produce an abnormality signal to deactivate the solenoid valves or other elements to be controlled.

The output signals are sent to driving units 12 through the output signal comparator G12 comprising NAND elements C1–C11 and NOR elements C2–C12 to drive solenoid valves $13_1$, $13_2$ . . . . The output of a watchdog circuit 14 is also inputted in the NOR elements C2, C4, C6, C8, C10, C12. If the watchdog circuit 14 detects any abnormality in the microcomputer, it will produce an abnormality detection signal, thus cutting off outputs of the NOR elements.

Though not shown, two additional series of units identical to the series of units shown in FIG. 2 are provided in the control/processing circuit to check any abnormality of the signals from the acceleration sensor G and the stop switch signal detector SW, respectively.

Numeral 15 indicates monitor lines for output signals.

Figure 3A:
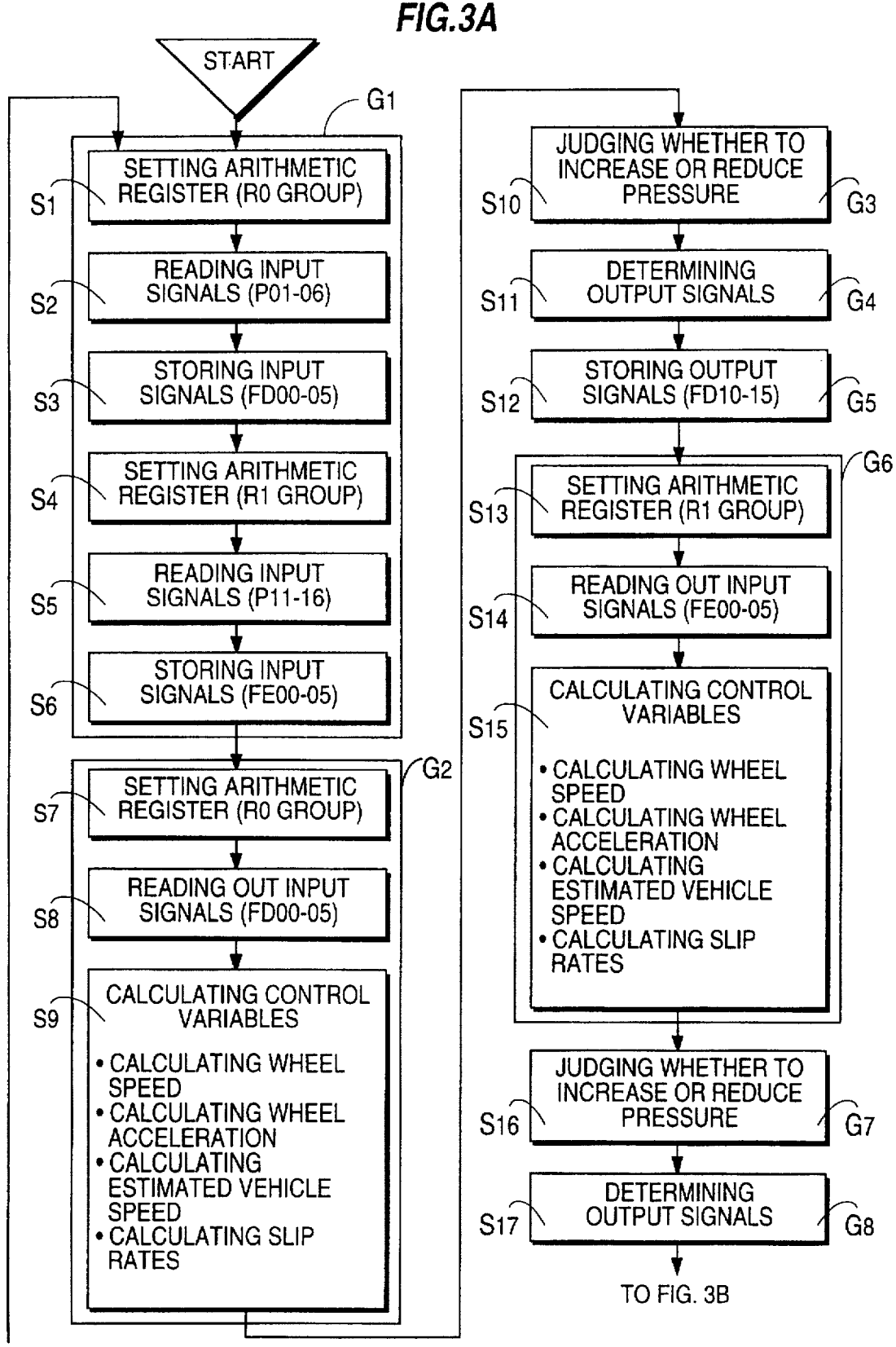
FIG. 3 is a detailed flowchart of the control logic terminal monitoring unit.

Now we will describe the operation of this embodiment with reference to the flowchart of FIG. 3.

After processing the signals from the wheel speed sensors S1–S4, G and SW in the input signal processing circuits 1 and 2, they are inputted in the input signal storage/processing unit G1. In this unit, with the arithmetic register set in R0 group in Step S1, the input signals S1–S4, G and SW are read into the unit G1 through ports P01–06 (Step S2) and stored in a RAM at addresses SFD00–05 (Step S3).

Then, with the arithmetic register set in R1 group in Step S4, the other of the two identical groups of input signals, S1–S4, G and SW are read into the unit G1 through ports P11–16 (Step S5), and stored in the RAM at addresses SFE00–05 (Step S6).

In this state, With the arithmetic register set back again in R0 group in Step S7, the input signals stored at SFD00–05 in RAM are read out (Step S8) and converted into control variables WS1–4, WSG and WSS that are proportional to the frequencies of the respective input signals. Based on these variables, wheel speeds, wheel acceleration, estimated vehicle speed, and slip rates are calculated (Step S9).

In Step S10, based on the results of the above calculation, determination is made whether to increase or reduce the brake pressures. More specifically, judgment is made whether to increase or reduce the brake pressure on each wheel based on the slip rates obtained.

Such judgment is made based on the variables obtained by the calculation in Step S9. For example, if the speed of a certain wheel drops below a threshold, judgment is made, according to the difference between the calculated wheel speed and the threshold, which signal is to be given for changing the control mode for the solenoid valves from pressure increase to pressure reduction mode or from pressure increase to pressure hold mode. Then, in Step S11, the pressure reduction or pressure hold signal is produced to control the brake pressure by opening and/or closing the solenoid valves V1 and V2.

The fact that the speed of a wheel is lower than the abovementioned threshold means that the slip rate of this wheel is high. In other words, in this state, the braking force is not effectively used to increase the friction against the tire. Thus, to increase the friction, the computer will reduce the braking force momentarily in spite of the fact that the brake pedal is being depressed. As soon as the slip rate decreases sufficiently, the solenoid valves are controlled to re-increase or hold the brake pressure. Thus, it is possible to obviate the possibility of wheel lockup.

The output is determined by the output signal determining unit G4 in the manner as described above. The output signals are stored in the RAM at SFE10–15.

Then, with the arithmetic register set at step S13 set in R1 group, the input signals stored in RAM at SFE00–05 are read out and converted into control variables WSI, WSG and WSS that are proportional to the frequencies of the respective input signals. In Step S15, these variables are used to calculate wheel speeds, vehicle acceleration, estimated vehicle speed, and slip rates. The above input signals are those inputted through the input terminals other than the first-mentioned ones.

Similar to the first group of input signals, these input signals are used to make judgment whether to increase or reduce the brake pressure (Step S16). In Step 17, based on the above judgment, an output is determined and transmitted. The output signals are stored in RAM at locations SFE10–15.

In this way, two outputs are determined based on the two groups of input signals inputted through two groups of input terminals. The output signals determined based on the input signals inputted through the first group of input terminals are outputted through ports P31–36 (Step S19). The output signals in the other group, which are stored in RAM at FD10–15, are read out (S21) with the arithmetic register set in R0 group in S20, and outputted through 11ports P21–26 (S22).

In this case, at e.g. ports P21 and P31, HI signals are produced when a request to actuate the solenoid valve V1 is made. The HI signals are inputted in the NAND element C1. Thus, a LOW signal is outputted from C1 element the NOR element of C2. The WD signal is also being inputted in C2.

The WD signal is a monitoring signal which is adapted to change into a HI level in case the one-chip microcomputer has run away or stopped functioning for unknown reasons. Normally, the WD signal is at a low level. Thus, in a normal state and when there is a request to actuate the solenoid valve, both signals applied to the C2 are at a low level, so that a signal to actuate the solenoid valve 131 (V1) is transmitted to the actuating circuit 121 (DV1), and the valve V1 is actuated. The other solenoid valves 132–4 (DV2–4) are also controlled in the same manner.

When the microcomputer produces output signals, the input terminal monitoring unit G11 checks if there is any input abnormality at the input terminals. More specifically, as shown in FIG. 4, a HI output is transmitted from port P37 to port P17 with the arithmetic register set in R2 group, and judgment is made whether or not a HI signal has actually been received at port P17. If the signal received is actually HI, then a LOW signal is sent from port P37 to port P17 to check if the signal received at port 17 is actually a LOW signal. If it is, the input terminals are judged to be functioning normally.

Failure to receive a HI or LOW signal at port P17 when a HI or LOW signal is sent from port 37 indicates that one or some of the input terminals are malfunctioning. In this case, the monitoring unit G11 produces an abnormality signal to cut off the outputs to the solenoid valves (V1–V4) and thus to make the antilock controller inoperative. Though not shown in the figures, if the abnormality signal is produced, a warning lamp provided near the driver is turned on to notify the driver that the antilock controller has become inoperative.

Figure 5:
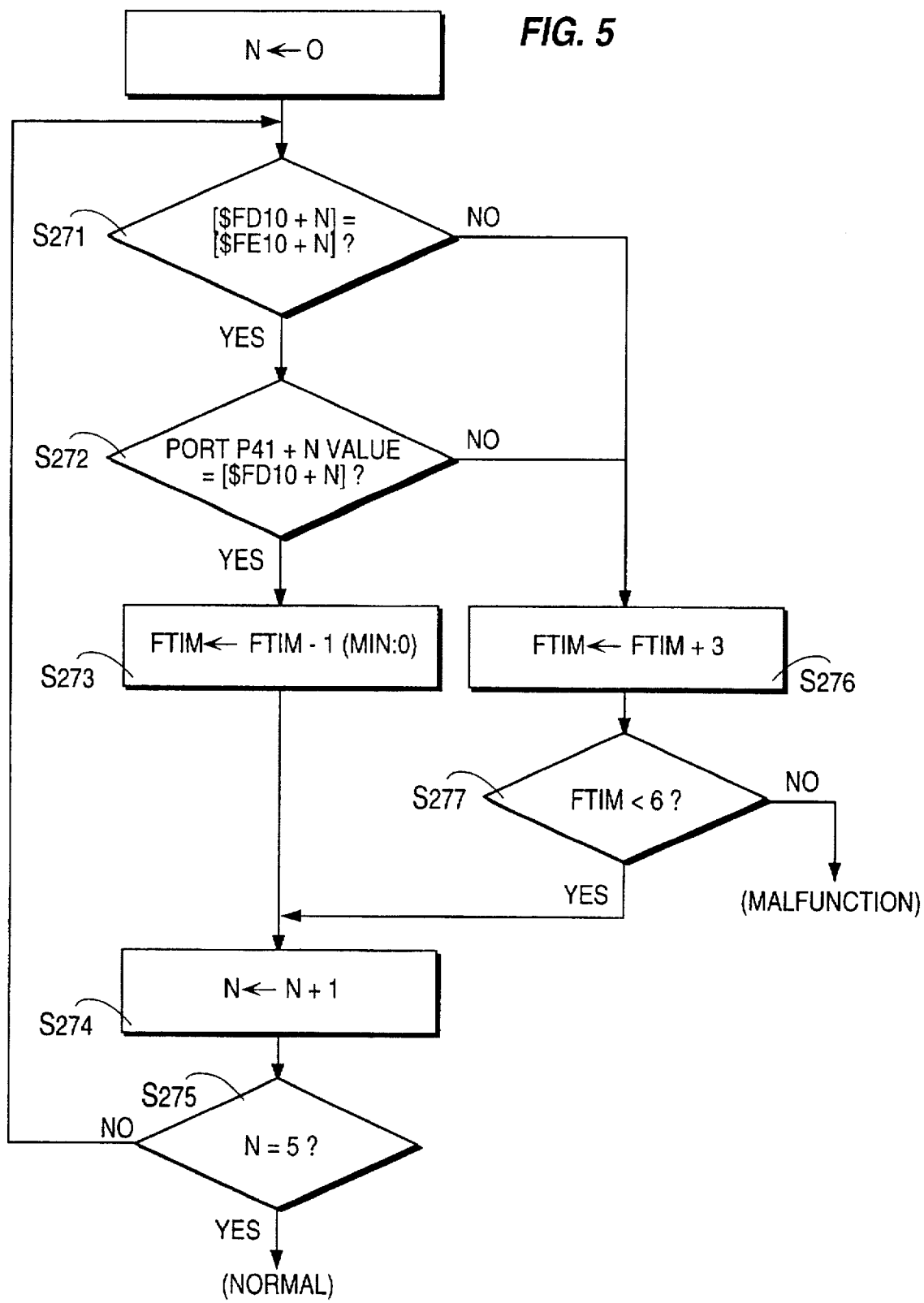
FIG. 5 is a flowchart of the comparison/processing unit.

After checking the input terminals, the outputs are checked by the output comparator G12. Namely, in Step S26, the two groups of output signals at the two groups of output terminals (SFD10–15 and SFE10–15) and the monitor signals of the output signals, i.e. the output signals determined in the output determining unit, are read out, and in Step S27, these three groups of signals are compared to one another in the manner as shown in the flowchart of FIG. 5. Namely, after setting the initial value of variable N at zero, judgment is made whether or not the first group of output signals FD10–15 and the second group of output signals FE10–15 are identical to each other in Step S271. If they are, judgment is made whether or not the first group of signals FD10–15 are identical to the monitor signals (ports P41–46) in Step S272.

If they are, in Step S273, integer one is subtracted from the value on a counter FTIM for counting the number of times abnormal states have happened (minimum value of the counter FTIM being zero). Then, after incrementing variable N by one in Step 274, judgment is made whether or not N=5 in Step 275. Since N is initially set at zero, the program returns to the starting point of the flow chart and the output signals are compared again.

This signal comparison routine is repeated until N becomes equal to five. During this routine, if, e.g. in Step S271, any of the signals FD10–15 is found out to be uncoincident with the corresponding one of the signals FE10–15, the counter FTIM is incremented by three (in Step S276). Any signal disparity in Step 272 will also result in the increment of the counter by three.

In Step S277, judgment is made whether the counter FTIM is indicating a number less than six. If it is, this means that the signal disparity has happened only once, which is still acceptable as normal. Thus, the computer returns to the normal round of routine. If the counter is indicating a number equal to or larger than 6, this means that the signal disparity has occurred more than once, which is not acceptable. Thus, the computer judges that output signals are abnormal and takes a countermeasure to cope with the abnormal state.

Also, if a disparity is detected between the monitor outputs of the monitor lines and the valve actuating outputs, antilock control function is prohibited by cutting off the outputs to the valves (DV1–V4).

We have so far described the antilock control function carried out mainly based on wheel speed signals. During antilock control, in which brake pressure increase and reduction signals are produced by detecting wheel lockup tendencies, a vehicle acceleration signal is being inputted in the processing units from the vehicle acceleration sensor G as a reference acceleration signal. This acceleration signal is compared with acceleration signals obtained by differentiating the wheel speed signals in the processing units. If the difference between the acceleration signals obtained by differentiation and the acceleration signal inputted from the sensor G is larger than a predetermined value, the reference acceleration signal is used in place of the acceleration signals obtained by differentiation.

The switch signal from the stop switch signal detector SW is also inputted in the processing unit in the same manner as the acceleration signal from the acceleration sensor G. The computer estimates the input speed of the brakes, i.e. the speed at which the brake pedal is depressed, by calculating the rate of change of heel speeds after the stop switch signal has been detected. Such input speed is used to adjust the sensitivity of pressure reduction when increasing and reducing brake pressures.

In this embodiment, four wheel speed sensors, four actuator valves and two relays are used. But their numbers are of course variable. For example, wheel speed signals may be inputted into the computer from two sensors, while their outputs may be transmitted to three valves and one relay.

Figure 6:
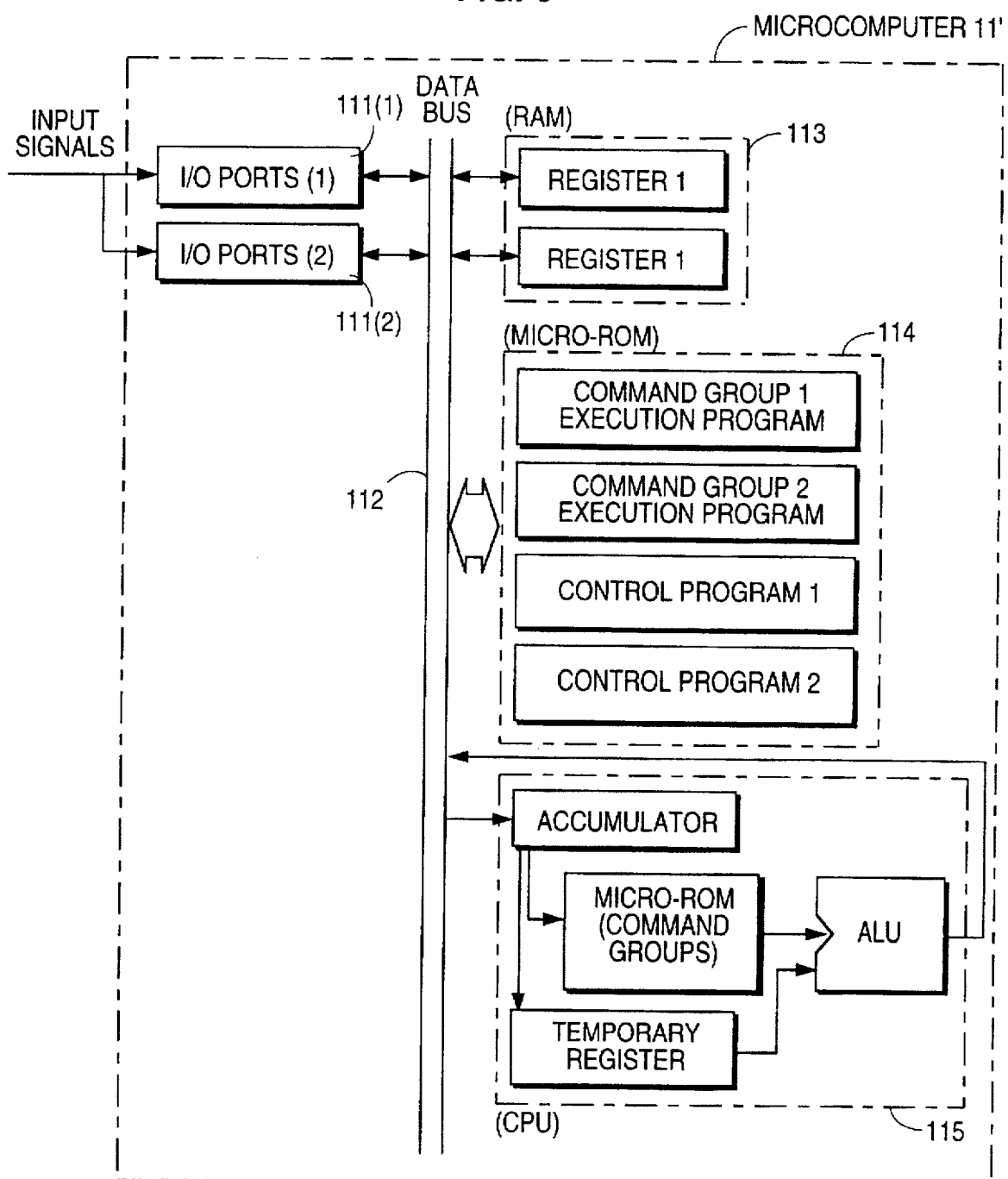
FIG. 6 is a block diagram of a microcomputer of a modified embodiment.

FIG. 6 is a block diagram showing the internal structure of a microcomputer 11', which is a slightly modified version of the microcomputer 11 of the first embodiment. In this embodiment, too, input signals are processed in the processing unit 1 or 2 shown in FIG. 1, split in two identical signals and inputted through two groups of ports (including ports P01 and P11). Since this embodiment differs from the first embodiment only in the i internal structure of the microcomputer 11', we do not show the entire structure of the entire antilock controller. But it will be apparent that the computer 11' is connected to the other parts in exactly the same way as the computer 11 shown in FIG. 1.

Two identical input signals are inputted into the computer through two I/O ports 111(1) and 111(2), respectively. Though not shown, it will be needless to say that each I/O ports also includes an output terminal.

The computer includes a data bus 112, a temporary memory (random access memory: RAM) 113 including registers 1 and 2, a fixed memory (read only memory: ROM) 114, and a central processing unit (CPU). The registers 1 and 2 are not completely separate registers but merely represent two different areas in the single memory. The input signals inputted through the I/O ports (1) and (2) are temporarily stored in the respective registers 1 and 2 at predetermined locations. They also temporarily store the results calculated in CPU 115.

Antilock control programs 1 and 2 are stored in two different areas in the ROM 114. Also stored in the ROM 114 are programs for executing command groups 1 and 2 (hereinafter referred to as command execution programs 1 and 2). These two programs are also stored in two different areas in the ROM 114.

The CPU 115 is an conventional one and includes an accumulator, a temporary register, a micro-ROM (for command groups), and an ALU (algorism unit).

As to the normal antilock control operation, the antilock controller of this embodiment is no different from that of the first embodiment. We will therefore describe only what is different from the first embodiment. But first, it is deemed necessary to clarify the relations between the parts and steps shown in FIG. 3 and those shown in FIG. 6. The input signal storage/processing unit G1 shown in FIG. 3 corresponds to the RAM 113 including the registers 1 and 2. The control programs 1 includes Step S9 carried out in the first processing unit G2 whereas the control program 2 includes Step 15 carried out in the second processing unit G6.

Needless to say, the CPU 115 carries out all the necessary calculations, judgment on pressure increase and reduction, and determination of output signals.

Figure 7A:
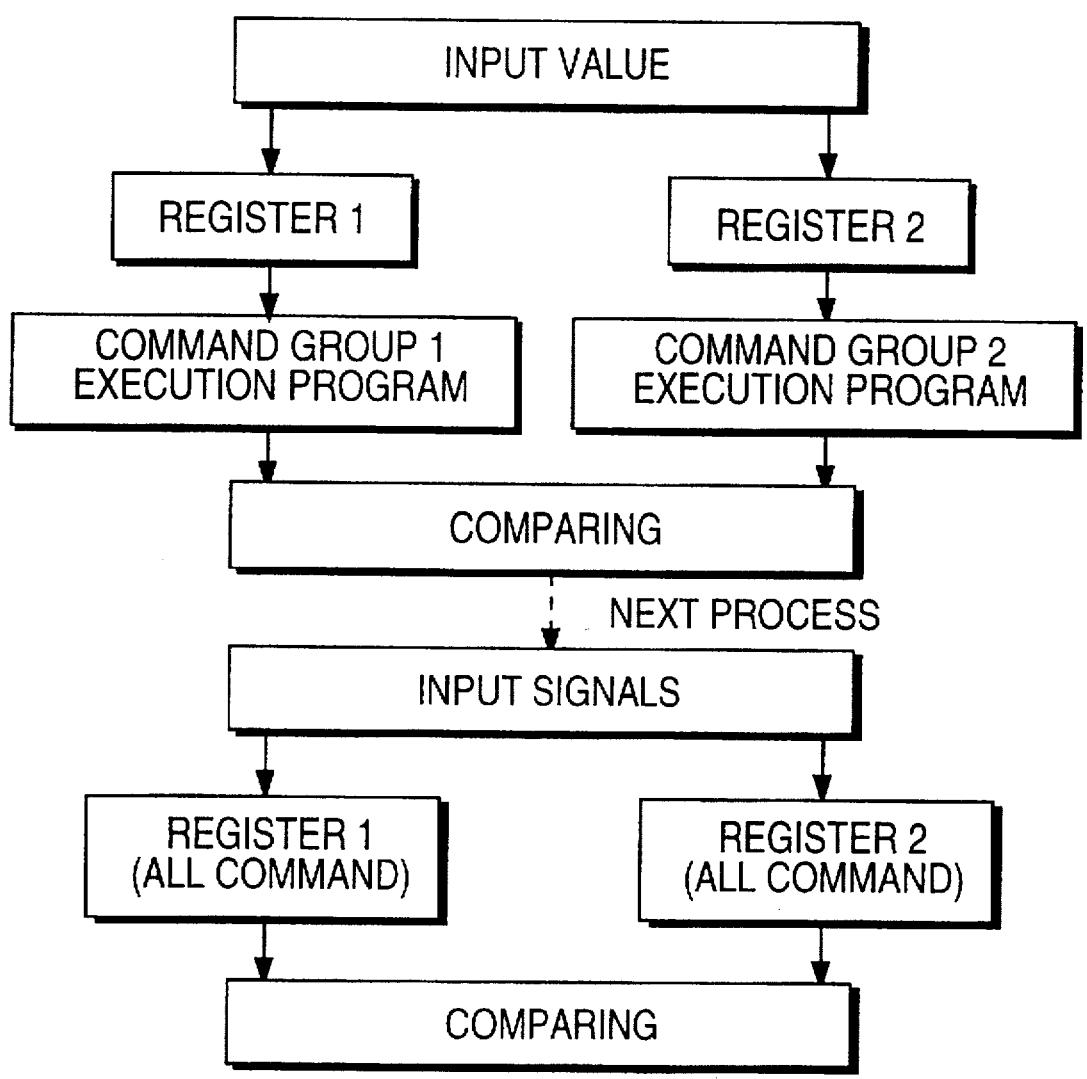
FIG. 7 shows the schematic flow and program of the command execution program.

Now we will describe the operation of this embodiment. FIG. 7(a) shows the flow of the main operation program, and FIG. 7(b) shows the steps for checking the results of calculations, including additions, subtractions, multiplications and divisions. For better understanding of FIG. 7(a), the registers 1 and 2 and the command execution programs 1 and 2 are illustrated parallel to each other. But this does not mean that the logic operation based on the command execution program 1 stored in register 1 is executed in parallel to the logic operation program 2 stored in register 2. Rather, the program in the register 2 is executed after the program in the register 1 has been executed.

If the program stored in the register 1 is one for multiplying a certain input value (X) by two and then subtracting the input value X from the multiplied value, then the program in the register 2 may be one for dividing the input value (X) by two and then adding the divided value to the divided value.

The input value (X) may be an input signal produced when the antilock control has started. Otherwise, such a value may be an external signal or a signal produced by a special signal producing means provided in the computer. For example, such a value may be an integer 100 or 1000 (binary signal).

Before starting antilock control, the abovementioned calculations are carried out in the CPU 115 using the input value (X) according to the command execution programs 1 and 2. The results obtained are stored in the registers 1 and 2 and the values in the respective registers 1, 2 are compared to each other.

The results in the registers 1, 2 are supposed to coincide as far as the CPU 115 is processing the inputs correctly and producing right outputs. If not, the CPU is judged to be not functioning normally. If it is judged to be functioning normally, antilock control procedure shown in FIG. 7(a) is started.

If the values in the two registers do not coincide, judgment is made that something is wrong with the CPU 115 and an abnormality detection signal is produced, which signal activates a failsafe mechanism to interrupt antilock control.

The single microcomputer according to the invention has two processing functions. Before starting antilock control, checking is made if the CPU is functioning normally. This makes it possible to improve the safety, stability and reliability of the antilock controller.

The command execution programs used in the modified embodiment are those for carrying out additions, subtractions, multiplications and divisions. But many other programs are conceivable. For example, such programs may be of a flag setting/resetting type, judgment sentence type, or assignment/takeout type, provided that they can check whether or not all the commands produced by the CPU are normal with high reliability.

In the embodiment, such command checking procedure is carried out before starting antilock control. But it may be done during antilock control or upon completion of antilock control.

Also, in the embodiment, the single microcomputer including two processing units each containing an antilock control program is used. But instead, a conventional microcomputer including a single processing unit may be used. In this arrangement, too, all the commands produced by the central processing circuit are inspected by the two command execution programs, so that the reliability of the entire device is much higher than conventional parallel processing or mutual monitoring type devices.

In the antilock controller according to the invention, each input signal is split into two identical signals, and the split signals are separately inputted in a single logic circuit. The antilock control is carried out while comparing the two split input signals with the logic circuit. With this arrangement, it is possible to construct the antilock controller from a single microcomputer while maintaining high reliability and safety of operation. Such a controller is especially suited for use as an automotive antilock brake controller because it is more reliable and less expensive than conventional controllers.

In an arrangement in which the microcomputer contains a program for checking whether the central processing unit (CPU) is functioning normally, it is possible to check the function of CPU before starting antilock control. This make it possible to further improve the safety, reliability and stability of operation of the antilock controller.

We claim:

1. An antilock controller comprising:
   wheel speed detecting means for producing wheel speed signals;
   means for splitting each of said wheel speed signals into two identical split signals; and
   a single control logic operation circuit including: a single central processing unit; at least two input terminals through which said split signals are separately inputted in said logic operation circuit; a first variable storage means for receiving one of said two split signals; a second variable storage means for receiving the other of said two split signals; a first processing program defining a means for controlling said central processing unit to process said one of said two split signals to determine a first output; a second processing program defining a means which is identical to and separate from said first processing program for controlling said central processing unit to process said split signal to determine a second output; at least two output terminals through which said first and second outputs are separately outputted; an output determining logic circuit for processing said first and second outputs and determining an output signal for driving solenoid valves, relays and other driven elements; and an output abnormality detection circuit for determining whether the output signal is normal by comparing and calculating the signals processed by said output determining logic circuit.

2. An antilock controller as claimed in claim 1 wherein one of said split signals is stored in said first variable storage means; the other of said split signals is stored in said second variable storage means; the one of said split signals stored in said first variable storage is processed; and the other of said split signals stored in said second variable storage means is processed.

3. An antilock controller as claimed in claim 2 further comprising an input terminal monitoring circuit comprising an additional input terminal connected only to one of said output terminals, and an input circuit for monitoring a signal inputted into said additional input terminal from said one of the output terminals.

4. An antilock controller as claimed in claim 3 wherein said output abnormality detection circuit judges that said two outputs are normal if the interval between the times when the two outputs are produced is smaller than a predetermined value, and judges that the two outputs are not normal if this time interval is greater than the predetermined value.

5. An antilock controller as claimed in claim 2 wherein said output abnormality detection circuit judges that said two outputs are normal if the interval between the times when the two outputs are produced is smaller than a predetermined value, and judges that the two outputs are not normal if this time interval is greater than the predetermined value.

6. An antilock controller as claimed in claim 1 further comprising an input terminal monitoring circuit comprising an additional input terminal connected only to one of said output terminals, and an input circuit for monitoring a signal inputted into said additional input terminal from said one of the output terminals.

7. An antilock controller as claimed in claim 6 wherein said output abnormality detection circuit judges that said two outputs are normal if the interval between the times when the two outputs are produced is smaller than a predetermined value, and judges that the two outputs are not normal if this time interval is greater than the predetermined value.

8. An antilock controller as claimed in claim 1 wherein said output abnormality detection circuit judges that said two outputs are normal if the interval between the times when the two outputs are produced is smaller than a predetermined value, and judges that the two outputs are not normal if this time interval is greater than the predetermined value.

9. An antilock controller as claimed in claim 1, wherein said single central processing unit is a single one-chip microcomputer.

10. A control logic operation circuit for use in an antilock controller comprising:
    a single control logic operation circuit including a single central processing unit, at least one input terminal, a processing program defining a means for controlling said central processing unit to process an input signal inputted through said input terminal to determine an output, a storage means for storing said input signal and said output, and a
    first and a second checking program defining a means for separately controlling said central processing unit to perform logic operations separately from each other, compare the results of the logic operations, and produce an abnormality signal if the results are not coincident with each other.

11. A control logic operation circuit for us in an antilock controller as claimed in claim 10 wherein said input terminal comprises at least two input terminals through which two identical signals obtained by splitting a single input signal are separately inputted, wherein said processing program comprises a first processing circuit and a first variable storage circuit for receiving and processing one of said two split signals, and a second processing circuit and a second variable storage circuit for receiving and processing the other of said two split signals, wherein said single central processing unit processes the signals produced by said first and second groups of circuits to produce a first and a second output, and further comprising at least two output terminals through which said first and second outputs are outputted, respectively, wherein the logic operations in said first and second checking programs are performed before carrying out the logic operations in said first and second processing circuits.

12. A control logic operation circuit for use in an antilock controller as claimed in claim 11 wherein all the commands of the central processing unit including commands for setting and resetting flags, judgement sentence commands, and assignment/takeout commands are shared by said checking programs.

13. A control logic operation circuit for use in an antilock controller as claimed in claim 11, wherein one of said first and second checking programs exclusively performs multiplication and subtraction operations on the data stored in one of said variable storage circuits, whereas the other of said first and second checking programs exclusively performs division and addition operations on the data stored in the other of said variable storage circuits, wherein during a normal antilock control operation a solution obtained by said multiplication and subtraction operations is the same as a solution obtained by said division and addition operations.

14. A control logic operation circuit for use in an antilock controller as claimed in claim 10, wherein one of said first and second checking programs exclusively performs multiplication and substraction operations on the data stored in said storage means, whereas the other of said first and second checking programs exclusively performs division and addition operations on the data stored in said storage means, wherein during a normal antilock control operation a solution obtained by said multiplication and subtraction operations is the same as a solution obtained by said division and addition operations.

15. A control logic operation circuit for use in an antilock controller as claimed in claim 10 wherein all the commands of the central processing logic circuit including commands for setting and resetting flags, judgment sentence commands, and assignment/takeout commands are shared by said checking circuits.

16. An antilock controller as claimed in claim 10, wherein said single central processing unit is a single one-chip microcomputer.

* * * * *